(12) United States Patent
Valovick et al.

(10) Patent No.: US 8,186,641 B2
(45) Date of Patent: May 29, 2012

(54) SHAFT RETAINING BRACKET ASSEMBLY

(75) Inventors: Brian Michael Valovick, Downers Grove, IL (US); Steven L. Leffingwell, White Lake, MI (US); Crittenden A. Bittick, Rochester Hills, MI (US); Ashfaq Saeed, Auburn Hills, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 16 days.

(21) Appl. No.: 12/808,386

(22) PCT Filed: Feb. 18, 2008

(86) PCT No.: PCT/US2008/054217
§ 371 (c)(1),
(2), (4) Date: Jun. 16, 2010

(87) PCT Pub. No.: WO2009/105091
PCT Pub. Date: Aug. 27, 2009

(65) Prior Publication Data
US 2011/0114815 A1    May 19, 2011

(51) Int. Cl.
F16D 3/00 (2006.01)
(52) U.S. Cl. .................. 248/560; 464/141; 384/536
(58) Field of Classification Search .................. 248/560; 464/141
See application file for complete search history.

(56) References Cited

U.S. PATENT DOCUMENTS

| 4,722,618 | A | 2/1988 | Matsumoto et al. |
| 5,551,783 | A | 9/1996 | Whitney et al. |
| 6,276,837 | B1 | 8/2001 | Iwano |
| 6,422,947 | B1 * | 7/2002 | Kelly et al. .................. 464/182 |
| 7,178,423 | B2 | 2/2007 | Breese et al. |
| 7,185,873 | B2 * | 3/2007 | Suka et al. .................. 248/635 |
| 7,611,288 | B2 * | 11/2009 | Lew .............................. 384/536 |
| 7,922,394 | B2 * | 4/2011 | Hirakawa et al. ............. 384/536 |

* cited by examiner

Primary Examiner — Terrell McKinnon
Assistant Examiner — Monica Millner
(74) Attorney, Agent, or Firm — Jennifer M. Brumbaugh; Mick A. Nylander; Rader, Fishman & Grauer PLLC

(57) ABSTRACT

A shaft retaining bracket assembly (100) and a method (400) of assembling the same is disclosed. A bracket assembly (100) may include an isolator (104) that receives a shaft and absorbs vibrations transmitted therethrough, and an integrally formed bracket (102). The bracket (102) may include a base portion (108) having at least one attachment hole (110) for securing the bracket (102) to a structural member, and a hoop (112) integrally formed with the base portion (108). The hoop (112) receives the isolator (104) such that the isolator (104) and the shaft are generally concentric about an axis (A) of the hoop (112). The bracket (102) further includes at least one retention flange (120) formed in the hoop, the retention flange (120) being configured to retain the isolator (104) within the hoop (112).

22 Claims, 3 Drawing Sheets

SHAFT RETAINING BRACKET ASSEMBLY

TECHNICAL FIELD

Described herein is a shaft retaining bracket assembly, such as may be employed to support a propeller shaft from a structural member of a vehicle.

BACKGROUND

Propeller shafts used in vehicle applications typically employ a bracket to generally support the shaft from a structural member of the vehicle, such as a portion of a frame of the vehicle. The bracket typically surrounds the shaft and supports it while allowing the shaft to rotate, such as to supply motive force to the wheels of the vehicle. Brackets generally must absorb at least a portion of the vibration that may be transmitted through or generated by the propshaft, while minimizing movement of the propshaft within the bracket, during operation. The brackets typically employ a vibration absorbing component or isolator to allow relatively small movements of the propshaft within the bracket while also retaining the propshaft in a proper position and absorbing vibration transmitted from the propshaft to the bracket, and further to the vehicle.

Brackets and isolators may generally result in a complex assembly having many small components that must be precisely fit together to properly provide required retention and vibration absorption characteristics for a particular vehicle application. For example, while it may be desirable to reduce parts by forming a bracket form a single piece, such as by casting or stamping the bracket, known one piece bracket designs generally have difficulty meeting retention requirements for most vehicle applications, even when meeting enhanced tolerance requirements required for the press-fit interfaces between the bracket and isolator. Accordingly, there is a need in the art for a simplified shaft retaining bracket assembly that can provide adequate retention properties while also reducing overall design and manufacturing costs and allowing for flexibility of the design, such that various structural properties of the bracket assembly may be modified without substantially altering the overall bracket design.

BRIEF SUMMARY

An exemplary shaft retaining bracket assembly may include an isolator that receives a shaft and absorbs vibrations transmitted therethrough, and an integrally formed bracket. The bracket may include a base portion having at least one attachment hole for securing the bracket to a structural member, and a hoop integrally formed with the base portion. The hoop receives the isolator such that the isolator and the shaft are generally concentric about an axis of the hoop. The bracket further includes at least one retention flange formed in the hoop, wherein the retention flange is configured to retain the isolator within the hoop.

A method of assembling a shaft retaining bracket assembly may include forming a bracket, the bracket including a base portion and a hoop. The hoop is joined to the base portion adjacent a stamping start plane associated with the bracket, and extends away from the stamping start plane, the base portion including at least one attachment hole for securing the bracket to a structural member. The method further includes inserting an isolator into the hoop, the isolator received generally concentrically about an axis of the hoop and configured to receive a shaft. The method may also include forming at least one retention flange in the hoop, thereby retaining the isolator within the hoop.

BRIEF DESCRIPTION OF THE DRAWINGS

While the claims are not limited to the illustrated embodiments, an appreciation of various aspects is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows.

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Figure 1A:
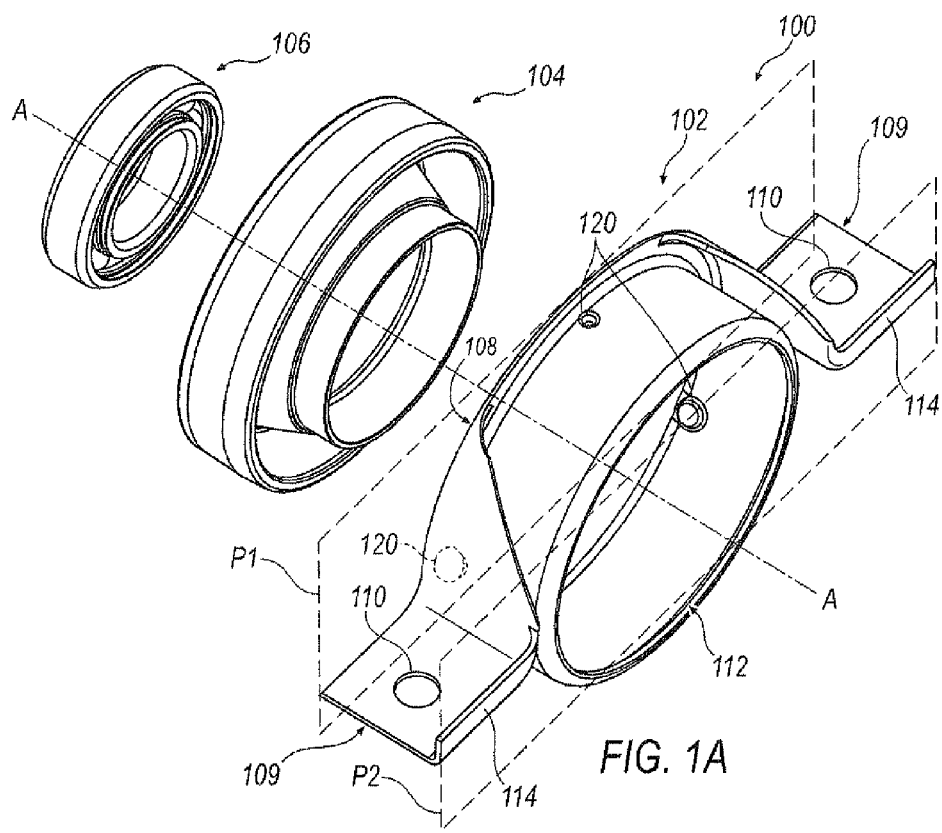
FIG. 1A is an exploded view of an exemplary shaft retaining bracket assembly.
Figure 1B:
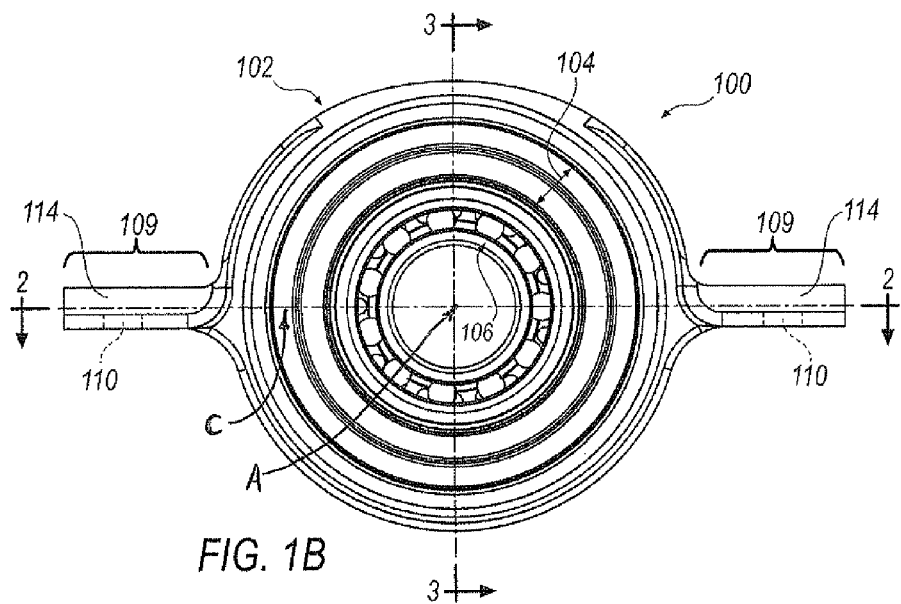
FIG. 1B is a frontal view of an exemplary shaft retaining bracket assembly.

Turning now to FIGS. 1A and 1B, a bracket assembly 100 is shown that is configured to receive a shaft (not shown), such as a propshaft. Bracket assembly 100 generally includes a bracket 102, an isolator 104, and a shaft bearing 106. The bracket assembly 100 may generally support the shaft for rotation, allowing the shaft to drive an axle, differential, or the like, to provide motive force to a vehicle.

Bracket 102 includes a base portion 108 and a hoop 112 extending from the base portion 108. Base portion 108 includes two generally planar attachment flanges 109 that extend from base portion 108 on either side of hoop 112. Each attachment flange 109 defines an attachment hole 110 which allows securement of bracket 102 to a structural member, such as with a bolt or other mechanical fastener. As generally shown in FIGS. 1A and 1B, hoop 112 may be formed integrally with base portion 108. For example, as will be further described below, hoop 112 may be formed in a stamping operation, wherein hoop 112 is stamped integrally with base portion 108 from a sheetmetal blank. Hoop 112 generally receives a shaft via the isolator 104 and a shaft bearing 106. Isolator 104 is configured to generally absorb vibrations of the shaft and dampen transmission of the vibrations through the isolator 104 to the bracket 102 and any structural member to which the bracket 102 is secured. The bearing 106 is generally configured to retain the shaft within the isolator 104 while generally allowing rotation of the shaft, and may include a plurality of rolling elements disposed about the shaft to allow rotation. Each of isolator 104 and bearing 106 are generally concentric about an axis A of hoop 112. Further, isolator 104 and bearing 106 may allow a small amount of movement of the shaft with respect to axis A in absorbing vibrations and/or allowing a minimal amount of rotation of the shaft about axis A during operation, e.g., orbiting.

Figure 2:
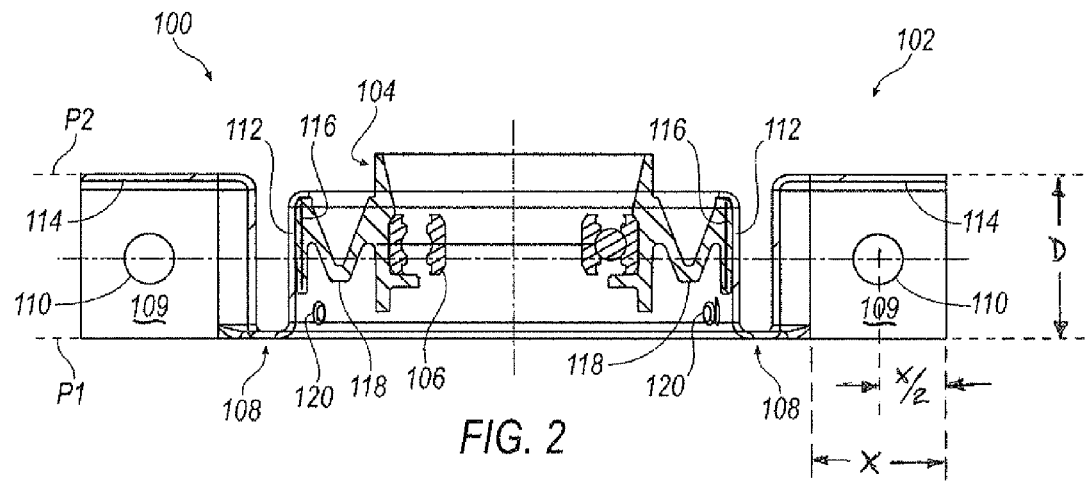
FIG. 2 is a lateral section view of the exemplary shaft retaining bracket assembly, taken through line 2-2 of FIG. 1B.
Figure 3:
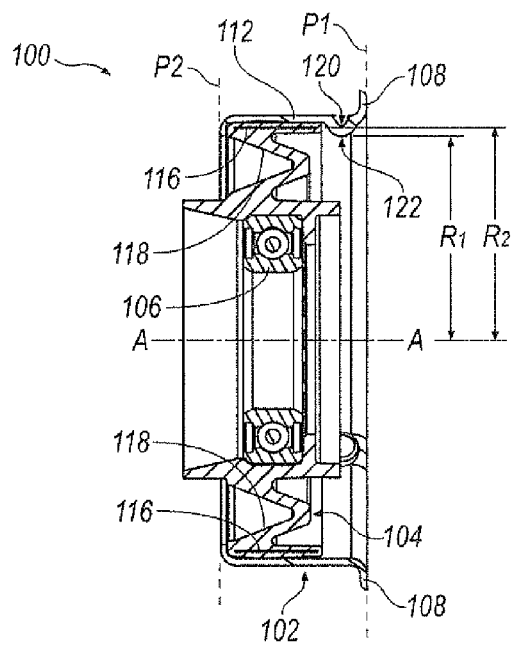
FIG. 3 is a vertical section view of the exemplary shaft retaining bracket assembly, taken through line 3-3 of FIG. 1B.

Turning now to FIGS. 2 and 3, hoop 112 and base portion 108 are shown in further detail. As briefly described above, hoop 112 may be integrally formed with base portion 108. For example, hoop 112 may be integrally formed with base portion 108 in a stamping operation. A sheetmetal blank may be initially disposed generally in a stamping start plane P1. Hoop 112 may then be stamped, e.g., a tooling die may generally stamp the hoop 112 in the sheetmetal blank such that hoop 112 extends away from the sheetmetal blank, and a portion of the hoop 112 is joined with base portion 108. Further, base portion 108 generally remains adjacent to or generally in stamping start plane P1, as best seen in FIG. 2. Stamping start plane P1 may thus generally be thought of as a starting point, where the sheetmetal blank is initially disposed prior to initiation of the stamping operation.

Referring now to FIG. 1A and FIG. 2, bracket 102 includes a stiffening flange 114 that extends from attachment flange 109. Stiffening flange 114 may be generally disposed in a stamping offset plane P2. Stamping offset plane P2 may be generally disposed parallel to stamping start plane P1, and offset a predetermined distance from stamping start plane P1. In other words, the distance between stamping start plane P1 and stamping offset plane P2 may generally be associated with a draw distance of the stamping operation that may be employed to form hoop 112 and/or stiffening flange 114. For example, as shown in FIG. 2, offset distance D is generally measured between planes P1 and P2 in a direction generally parallel to axis A, which may coincide with a direction of movement of a stamping die used to form bracket 102. Stiffening flange 114 may be disposed generally perpendicular to attachment flange 109 and turned upward, as best seen in FIGS. 1A and 1B, such that it extends upwards and away from base portion 108. The direction stiffening flange 114 is turned relative to attachment flange 109 may be determined at least in part by a desired attachment of bracket 102 to a structural member (not shown) of a vehicle. Further, by providing stiffening flange 114 generally in stamping offset plane P2, stiffening flange 114 may be incorporated into other stiffening features of base portion 108, e.g., additional flanges formed along the length of base portion 108. Stiffening flange advantageously lends stability and enhances the stiffness of hoop 112 and bracket 102 as a whole. The additional stiffness provided by stiffening flange 114 may generally allow an overall size and weight of bracket 102 to be reduced as compared with a bracket that does not employ a stiffening flange 114, or employs a stiffening flange that extends from a different portion of bracket 102 or attachment flange 109. For example, a thinner sheet metal stock may be employed for formation of bracket 102 thereby decreasing overall size and mass of bracket 102, while still meeting a target stiffness requirement. Further, by decreasing the overall mass of bracket 102 and at least maintaining the stiffness, such as by the addition of stiffening flange 114, a natural frequency of bracket 102 may be increased.

As described above, bracket assembly 100 may be secured to one or more structural members of a vehicle by way of attachment holes 110. An overall stiffness characteristic of bracket assembly 100 may generally be enhanced by placing attachment holes 110 on either side of hoop 112, and locating attachment holes relatively close to hoop 112. In other words, overall stiffness of bracket 102 may be increased as a result of attachment holes 110 being spaced apart by a minimal distance. For example, as shown in FIG. 2, attachment flange 109 has an overall width of X, and a center of attachment hole 110 is located at least halfway along the width of attachment flange 109, i.e., one-half of X, measured from an outer edge of bracket 102. Attachment holes 110 may each be located even further from an outer edge of the attachment flange 109, i.e., greater than one-half of the overall width of attachment flange 109, to maximize a stiffness of bracket 102. Generally, the degree to which the attachment holes 110 may be closely spaced together is only limited by the ability of tooling used to form bracket 102, e.g., a stamping die, to form a transition radius of along bracket 102 between attachment flange 109 and/or hoop 112 or base portion 108. Further, a particular application for bracket 102 may dictate the degree to which the attachment holes 110 may be spaced apart. In other words, the attachment holes 110 generally are at least spaced far apart enough to allow tools to secure the bracket 102 to a vehicle or structural member using mechanical fasteners, e.g., bolts, etc. Further, by providing stiffening flange 114 in stamping offset plane P2, the attachment flanges 109 defining each attachment hole 110 may each be generally disposed a maximum amount downward relative to bracket 102 and/or hoop 112 as seen in FIG. 2, thereby increasing the effective vertical extension of stiffening flange 114 along an interface with base portion 108. For example, as best seen in FIG. 2, each attachment flange 109 and attachment hole 110 is disposed generally below a centerline C of the hoop 112 that includes axis A. The stiffening features of bracket 102, e.g., stiffening flange 114 and any additional flanges disposed on base portion 108, may thus have a maximum vertical extension (i.e., in an up/down direction as seen in FIG. 2) along bracket 102, thereby further increasing the overall stiffness of the bracket 102. Accordingly, an overall stiffness characteristic of bracket 102 may be modified in at least three ways that do not significantly affect mass or size of the overall part: (1) provision of a stiffening flange 114 may generally increase overall stiffness of bracket 102, (2) attachment holes 110 may be spaced closer together to increase overall stiffness of bracket 102 as it is installed to one or more structural members of a vehicle, and (3) provision of stiffening flange 114 in a plane offset from stamping start plane P1, e.g., stamping offset plane P2, allows attachment flanges to be located generally below a centerline of hoop 122, thus providing a maximum vertical extension of stiffening flange 114 and/or other stiffening flanges of bracket 102.

Turning now to FIGS. 2 and 3, the retention of isolator 104 within hoop 112 is shown in greater detail. Isolator 104 may include an outer support ring 116 having a vibration absorbing material 118 disposed about the outer support ring 116. For example, a rubber vibration absorbing material may be formed about outer support ring 116. Any other configuration of an isolator 104 may be employed that provides adequate vibration absorbing to a shaft retained within bracket assembly 100.

Isolator 104, as briefly described above, may be retained within hoop 112 by one or more retention flanges 120. Retention flanges 120 may be formed integrally with hoop 112, and extend inward toward axis A, thereby generally retaining isolator 104 within hoop 112 by interfering with at least outer support ring 116 of isolator 104. As best seen in FIG. 1A and FIG. 3, three equidistantly spaced retention flanges 120 are formed about a perimeter of hoop 112. Retention flanges 120 each generally define an inner surface or inner portion 122 that forms a radius R1 with axis A of the bracket assembly 100, as best seen in FIG. 3. Radius R1 is smaller than radius R2 that is formed by an inner surface of outer support ring 116 with axis A. In other words, R2 generally represents an inside radius of outer support ring 116 of isolator 104, i.e., the distance from axis A to an inside surface of outer support ring 116. The retention flanges 120 may extend fully beyond outer support ring 116, i.e., from an outer side of outer support ring 116, and beyond an inner surface, e.g., an inside diameter, of outer support ring 116, thereby providing a maximum level of interference between the retention flanges 120 and the outer support ring 116. Accordingly, retention flanges 120 generally interfere with outer support ring 116 such that isolator 104 is securely and robustly retained within hoop 112. Retention flanges 120 may be formed by a stamping or forging tool that generally punches a small portion of hoop 112 inward toward axis A, thus providing a convenient method for retaining isolator 104 within bracket 102 and/or hoop 112.

The size and general configuration of retention flanges 120 may generally be easily modified or changed, without altering the general design of the rest of bracket 102 or tooling used to produce bracket 102. Merely as an example, it may be desirable to modify a shape of isolator 104 and/or outer support ring 118 to provide increased vibration absorption characteristics of bracket assembly 100 while not requiring extensive redesign of various portions of bracket 102, e.g., hoop 112. Further, modifications and overall complexity of an isolator mold used to form isolator 104 are minimized. Accordingly, as retention flange 120 is preferably sized such that it interferes only with outer support ring 116, retention flanges 120 may generally be easily altered according to any changes in the configuration of isolator 104.

Additionally, retention flanges 120 generally provide a robust retention of isolator 104. For example, retention flanges 120 may be used in place of or in combination with traditional press-fit methods of installing an isolator to a bracket, allowing increased retention of isolator 104 by way of the positive interference between retention flanges 120 and a portion of isolator 104, e.g., outer support ring 116.

Figure 4:
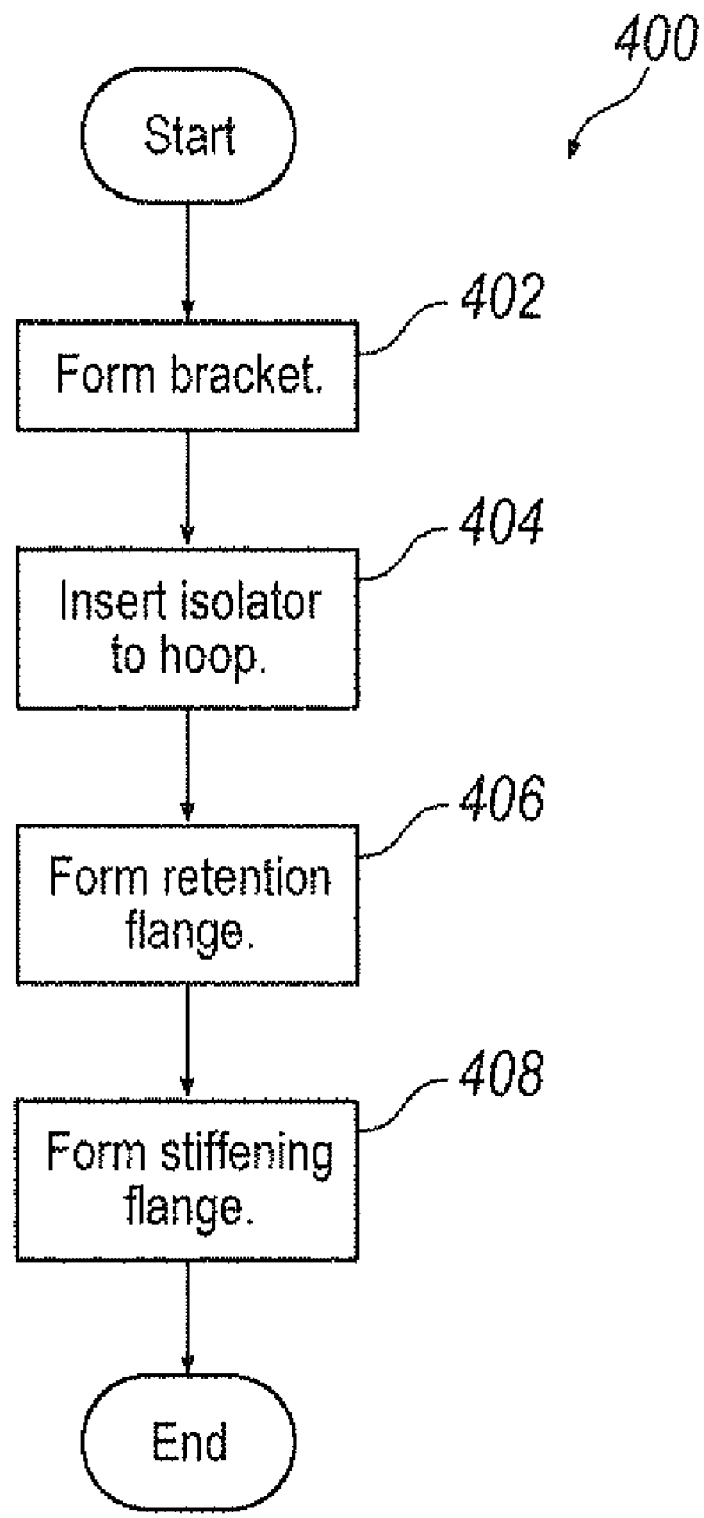
FIG. 4 is a process flow diagram of an exemplary process for assembling a shaft retaining bracket assembly.

Turning now to FIG. 4, a process 400 for assembling a shaft retaining bracket assembly 100 will be described. Process 400 may generally begin at step 402 where a bracket 102 is formed. For example, as described above, a hoop 112 may be integrally formed with a base portion 108 of bracket 102, such as in a stamping operation. Further, as described above, a sheetmetal blank may be disposed initially in stamping start plane P1, and hoop 112 may be stamped such that hoop 112 generally extends away from stamping start plane P1, while base portion 108 generally remains disposed within stamping start plane P1. Further, attachment portions 109 of base portion 108 may be formed in subsequent stamping operations such that the attachment flanges 109 extend away from base portion 108 and toward stamping offset plane P2. Further, attachment holes 110 may be formed in attachment flanges 109, thereby allowing securement of bracket 102 to a structural member. Process 400 may then proceed to step 404.

In step 404, an isolator 104 may be inserted into hoop 112. For example, as described above, isolator 104 may be inserted into hoop 112 such that it is disposed generally concentric within hoop 112 about axis A of hoop 112. As isolator 104 need not be installed to hoop 112 with a press-fit interface, as retention flanges 120 may provide adequate or improved retention of isolator 104 within hoop 112, thereby simplifying installation of isolator 104 to hoop 112. In other words, isolator 104 need not be designed to provide an interference with hoop 112 upon initial insertion of isolator 104 to hoop 112, thereby generally increasing design tolerances associated with isolator 104 and/or hoop 112. Process 400 may then proceed to step 406.

In step 406, one or more retention flanges 120 may be formed. Retention flange 120 generally retains isolator 104 within hoop 112 by way of the positive interference between retention flanges 120 and outer support ring 116 of isolator 104. For example, as described above, retention flanges 120 may be formed with an inner portion 122 or inner surface 122 that defines a radius R1 extending from axis A, that is generally smaller than radius R2 of an outer support ring 116 of isolator 104, thereby retaining isolator 104 within hoop 112. It may be preferable to form retention flanges 120 after isolator 104 is inserted into hoop 112, especially where isolator 104 is retained within hoop 112 by a smaller diameter portion of hoop 112, e.g., isolator 104 could only be inserted into hoop 112 from one end of hoop 112. Accordingly, isolator 104 may be retained at one end by the smaller diameter portion of the hoop 112, and at an opposing end by the retention flanges 120. The formation of retention flanges 120 thus may generally simultaneously also retain isolator 104 within hoop 112. Process 400 may then end, or may optionally proceed to step 408.

In step 408, a stiffening flange 114 may be formed in bracket 102. For example, as described above, stiffening flange 114 may extend away from attachment flanges 109, and may be disposed generally in stamping offset plane P2. As described above, stiffening flange 114 may be formed integrally with base portion 108 such that stiffening flange extends away from base portion and is offset from stamping start plane P1, thereby lending additional stiffness and/or structural stability to bracket 102. Further, step 408 may be generally integrated as part of step 402, i.e., stiffening flange 114 may be integrally stamped in a generally single stamping process along with bracket 102 and/or various components of bracket 102.

Accordingly, a bracket assembly 100 and a method of assembling a bracket assembly may advantageously provide manufacturing simplicity and flexibility to allow for various changes to a simplified bracket assembly 100 while not requiring development of entirely new tools. For example, as described above, stiffness characteristics of a bracket 102 may be optimized by varying an overall thickness of a sheetmetal blank used to form bracket 102 and providing stiffening flanges 114. Further, retention flanges 120 provide robust retention of isolator 104 within hoop 112, while also allowing a simplified installation of isolator 104 to hoop 112 by eliminating any requirement for a press-fit interface between the vibration absorbing material 118 of isolator 104 and hoop 112. Retention flanges 120 also may be themselves easily modified without significant tooling changes to allow use of different isolators 104.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain examples, and should in no way be construed so as to limit the claimed invention.

Accordingly, it is to be understood that the above description is intended to be illustrative and not restrictive. Many examples and applications other than the illustrations provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A bracket assembly for securing a shaft to a structural member, comprising:
    an isolator configured to receive a shaft and absorb vibrations of the shaft transmitted to the structural member; and
    an integrally formed bracket, including:
        a base portion including a planar portion aligned in a first plane and at least one attachment flange extending away from the planar portion, the attachment flange defining an attachment hole for securing said bracket to a structural member;
        a hoop integrally formed with and extending axially away from said planar portion of said base portion, said hoop receiving said isolator, wherein the isolator and shaft are generally concentric about an axis of said hoop; and
        at least one retention flange formed in said hoop, said retention flange configured to retain the isolator within said hoop.

2. The bracket assembly of claim 1, wherein said hoop is integrally joined with said base portion adjacent said first plane, wherein said first plane is a stamping start plane of said hoop, said bracket assembly further comprising a stiffening flange formed on said base portion, said stiffening flange aligned in a stamping offset plane, said stamping offset plane being generally parallel to said stamping start plane and offset from said stamping start plane by a predetermined distance such that said stamping start plane does not include any portion of said stiffening flange.

3. The bracket assembly of claim 2, wherein said stiffening flange is turned in a direction generally perpendicular to said base portion and upward from said base portion.

4. The bracket assembly of claim 2, wherein said hoop is stamped integrally with said base portion, and said stiffening flange is stamped integrally with said base portion.

5. The bracket assembly of claim 1, wherein said isolator includes an outer support ring and a vibration absorbing material formed about said outer support ring.

6. The bracket assembly of claim 1, wherein said at least one retention flange includes at least three retention flanges.

7. The bracket assembly of claim 6, wherein said retention flanges are spaced generally equidistantly about said hoop.

8. The bracket assembly of claim 1, wherein said at least one retention flange defines an inner radius measured from said axis, said inner radius being smaller in magnitude than a radius of an outer support ring of said isolator measured from said axis, thereby retaining said isolator within said hoop.

9. The bracket assembly of claim 8, wherein said at least one retention flange extends from an outer side of said outer support ring beyond an inner surface of said outer support ring, thereby providing a maximum interference with said outer support ring and retaining said isolator within said hoop.

10. The bracket assembly of claim 1, wherein said base portion includes at least one attachment flange defining said at least one attachment hole, said attachment flange disposed generally below a centerline of said hoop, said centerline including said axis.

11. An integrally formed shaft retaining bracket, comprising:
    a base portion including a planar portion aligned in a first plane and at least one attachment flange extending away from the planar portion, the attachment flange defining an attachment hole for securing said base portion to a structural member;
    a hoop integrally formed with and extending axially away from said planar portion of said base portion, said hoop configured to receive an isolator, the isolator configured to receive a shaft, wherein the isolator and shaft are generally concentric about an axis of said hoop; and
    at least one retention flange formed in said hoop, said retention flange configured to retain the isolator within said hoop.

12. The bracket of claim 11, wherein said hoop is integrally joined with said base portion adjacent said first plane, wherein said first plane is a stamping start plane of said hoop, said bracket further comprising a stiffening flange formed on said base portion, said stiffening flange aligned in a stamping offset plane, said stamping offset plane being generally parallel to said stamping start plane and offset from said stamping start plane by a predetermined distance such that said stamping start plane does not include any portion of said stiffening flange.

13. The bracket of claim 12, wherein said stiffening flange is turned in a direction generally perpendicular to said base portion and upward from said base portion.

14. The bracket of claim 12, wherein said hoop is stamped integrally with said base portion, and said stiffening flange is stamped integrally with said base portion.

15. The bracket of claim 11, wherein said at least one retention flange includes at least three retention flanges.

16. The bracket of claim 15, wherein said retention flanges are spaced generally equidistantly about said hoop.

17. The bracket of claim 11, wherein said base portion includes at least one attachment flange defining said at least one attachment hole, said attachment flange disposed generally below a centerline of said hoop, said centerline including said axis.

18. A method of assembling a shaft retaining bracket assembly, comprising:
    forming a bracket, said bracket including a base portion and a hoop, said base portion including a planar portion aligned in a first plane and at least one attachment flange extending away from the planar portion, said hoop extending axially away from the planar portion of said base portion, said hoop joined to said base portion adjacent said first plane, wherein said first plane is a stamping start plane associated with said bracket, said hoop extending away from said stamping start plane, said attachment flange including an attachment hole for securing said bracket to a structural member;
    inserting an isolator into said hoop, said isolator received generally concentrically about an axis of said hoop and configured to receive a shaft, said isolator configured to absorb vibration of the shaft; and forming at least one retention flange in said hoop, thereby retaining said isolator within said hoop.

19. The method of claim 18, wherein said retention flange is formed after inserting said isolator into said hoop.

20. The method of claim 18, further comprising integrally forming a stiffening flange with said base portion, said stiffening flange generally disposed in a plane offset from said stamping start plane such that said stamping start plane does not include any portion of said stiffening flange, said base portion and said hoop being integrally formed together.

21. The method of claim 18, wherein:

forming said at least one retention flange includes defining an inner portion of said retention flange, said inner portion of said retention flange defining a first radius extending from said axis;

said isolator includes an outer support ring and a vibration absorbing material disposed about said outer support ring; and said first radius is smaller in magnitude than an inside radius of said outer support ring, thereby retaining said isolator to said bracket.

22. The method of claim 18, wherein said base portion and said hoop are integrally stamped together from a sheetmetal blank.

* * * * *